(12) United States Patent
Laurion

(10) Patent No.: US 7,814,054 B2
(45) Date of Patent: Oct. 12, 2010

(54) SYSTEM AND METHOD FOR PROVIDING COMMON OPERATORS ACROSS MULTIPLE APPLICATIONS

(76) Inventor: James E. Laurion, 2601 NW. 14th St., Ankeny, IA (US) 50023

( * ) Notice: Subject to any disclaimer, the term of this patent is extended or adjusted under 35 U.S.C. 154(b) by 387 days.

(21) Appl. No.: 12/080,703

(22) Filed: Apr. 3, 2008

(65) Prior Publication Data
US 2009/0254580 A1 Oct. 8, 2009

(51) Int. Cl.
G06F 17/30 (2006.01)
(52) U.S. Cl. ............... 707/620; 707/695; 707/806; 715/774
(58) Field of Classification Search ......... 707/620, 707/695, 806; 715/774
See application file for complete search history.

(56) References Cited

U.S. PATENT DOCUMENTS

| 4,899,299 | A | 2/1990 | MacPhail | |
|---|---|---|---|---|
| 5,146,600 | A | 9/1992 | Sugiura | |
| 5,457,797 | A * | 10/1995 | Butterworth et al. | 719/320 |
| 5,832,474 | A | 11/1998 | Lopresti et al. | |
| 6,092,091 | A | 7/2000 | Sumita et al. | |
| 6,607,314 | B1 * | 8/2003 | McCannon et al. | 400/62 |
| 6,697,088 | B1 * | 2/2004 | Hollander | 715/744 |
| 7,103,611 | B2 | 9/2006 | Murthy et al. | |
| 7,636,922 | B2 * | 12/2009 | Odins-Lucas et al. | 719/328 |
| 7,720,810 | B2 * | 5/2010 | Locke et al. | 707/620 |
| 2002/0124028 | A1 | 9/2002 | Kroeger | |
| 2002/0133390 | A1 | 9/2002 | Kroeger | |
| 2003/0063120 | A1 * | 4/2003 | Wong et al. | 345/746 |
| 2003/0067489 | A1 * | 4/2003 | Candy Wong et al. | 345/765 |
| 2005/0246725 | A1 * | 11/2005 | Odins-Lucas et al. | 719/328 |
| 2006/0148520 | A1 * | 7/2006 | Baker et al. | 455/556.2 |
| 2006/0259909 | A1 | 11/2006 | Passero et al. | |
| 2007/0047780 | A1 * | 3/2007 | Hull et al. | 382/124 |
| 2007/0294348 | A1 | 12/2007 | Cohen et al. | |
| 2008/0263333 | A1 * | 10/2008 | Wang et al. | 712/220 |
| 2009/0013255 | A1 * | 1/2009 | Yuschik et al. | 715/728 |

OTHER PUBLICATIONS

Marc Abrams et al. UIML: A Device-Independent User Interface Markup Language, Sep. 26, 2000, pp. 1-41.*
Instigae CJSC, Overview of Instigate Application Framework, Jul. 2009, pp. 1-2.*

* cited by examiner

*Primary Examiner*—John R. Cottingham
*Assistant Examiner*—Sherief Badawi
(74) *Attorney, Agent, or Firm*—Brett Trout

(57) ABSTRACT

A system and technique for managing and manipulating data objects, and more particularly data files, of different types utilizing a common user interface. The system allows management of folders and files across many different file types native to many different source applications, such as operating system files, document management system files, photo storage applications, electronic computer aided drawing vaults and the like. The system initializes by requesting an operations list including file information which the system uses to map source application commands to predetermined common commands associated with the system. The system also uses the operations list to display folders and files using native icons and to query the user using text associated with the underlying source application, allowing for ease of file management across a broad array of file applications and types.

20 Claims, 6 Drawing Sheets

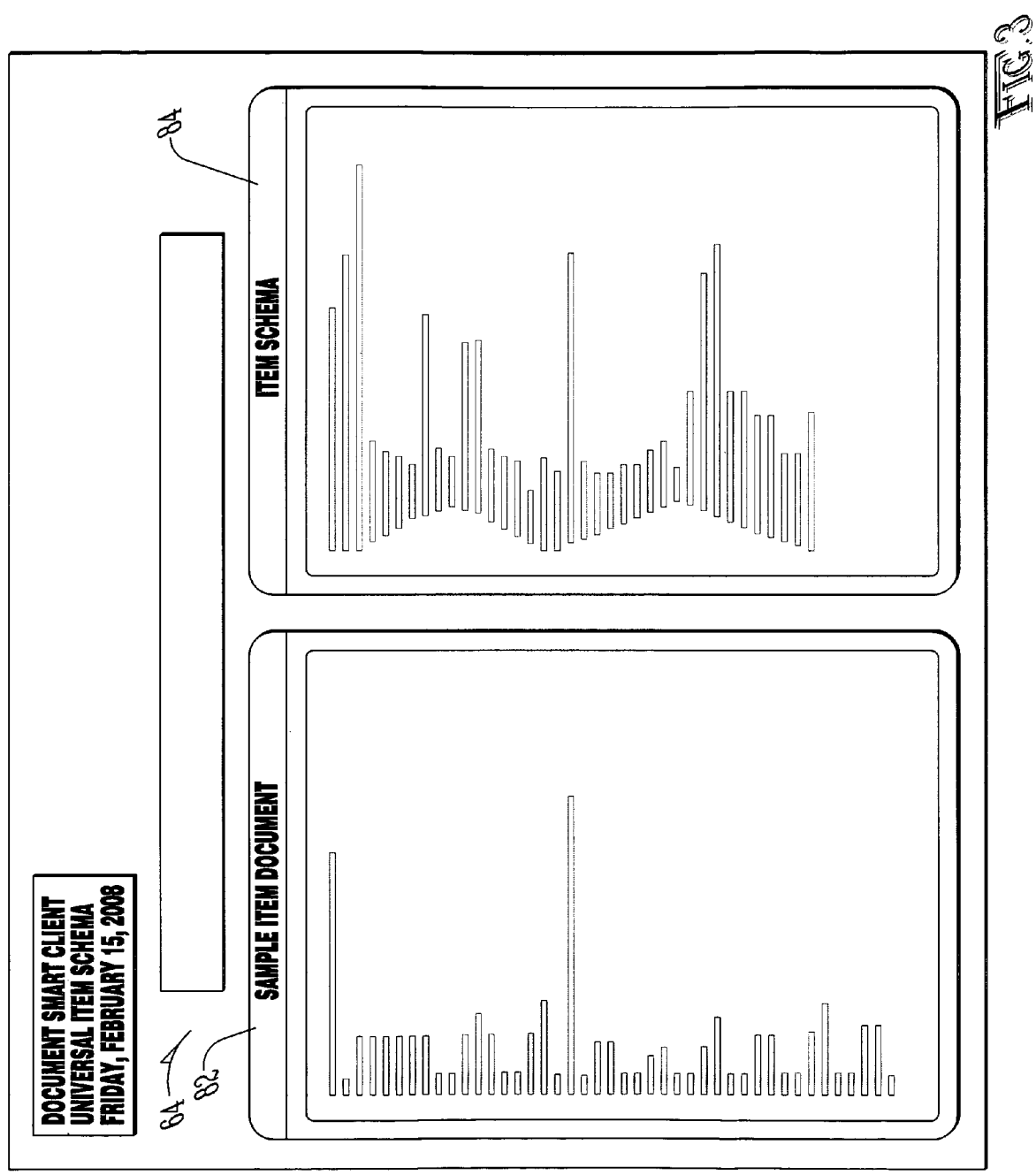

SYSTEM AND METHOD FOR PROVIDING COMMON OPERATORS ACROSS MULTIPLE APPLICATIONS

BACKGROUND OF THE INVENTION

1. Field of the Invention

The present invention relates in general to a document management system and, more particularly, to a document management system utilizing application specific graphics, commands and text in a global document management environment.

2. Description of the Prior Art

Document management systems are well-known in the art. Given the diversity of document types maintained by such systems, prior art document management systems use a standard set of commands, icons and text unique to the document management system. Unfortunately, these standard commands are often unique to the document management system and may bear little resemblance to the commands, icons and text associated with the underlying "source" applications associated with the documents being managed.

Retrieving and managing numerous document types from a large database is difficult enough without users having to adapt to, and make assumptions about, how the document management system standard commands, icons and text relate to the commands, icons and text associated with the underlying source applications with which they are familiar. It would therefore be desirable to provide a document management system capable of utilizing the commands, icons and text associated with the underlying source applications.

One problem with prior art document management systems is that source applications, like document management system applications, file storage applications, and operating systems do not use the same types of commands, icons and text. One source application may use the phrase "trash can" for substantially the same item another underlying source application uses the phrase "graveyard." Selecting one phrase over the other in a document management system cannot help but confuse users expecting encountering "graveyard" when they expect to see a "trash can." It would therefore be desirable to provide a document management system capable of utilizing source application specific descriptive text.

An additional drawback associated with prior art document management systems involves source applications changing commands, icons and text with subsequent versions. Even if a prior art document management system was programmed with "source application specific" commands, icons and text, the document management system would have to be modified and updated every time one of the many underlying source applications changed. Additionally, between the time of the underlying source application change and the update to the document management system, the document management system may crash or, at the very least, not be able to utilize the most current commands, icons and text associated with the underlying source applications. It would therefore be desirable to provide a document management system capable of utilizing the most current commands, icons and text associated with the underlying source applications.

Yet another drawback associated with prior art document management systems is the adoption of document management system icons for files, rather than the underlying source application icons with which users have become accustomed. While not critical successful operation of a document management system, the use of unfamiliar icons runs the risk of increasing delays and mistakes associated with misidentification. It would therefore be desirable to provide a document management system which utilized the same file icons as the underlying source applications.

While it might be possible to program a document management system with all of the unique commands, icons and text associated with certain source applications, the document management system would still not be able to utilize the commands, icons and text associated with other source applications the user may wish to utilize. The system would also not be able to utilize the commands, icons and text associated with new source applications as they became available.

Although there are some prior art systems which do allow for a minimal amount of cross application commands, such prior art applications are designed with similar software modules and similar commands either very specific to particular source applications or very generic, limiting themselves to only the most basic commands. Accordingly, functionality-rich cross-platform systems are relegated to custom application specific environments, or are difficult to use, functionality poor systems, using generic icons and text and capitalizing on those few commands and operations with a specific identity spanning as many source applications as possible. It would, therefore, be desirable to provide a functionality rich system with the ability to utilize a broad range of operators across many underlying source applications.

Based upon the foregoing, it would be desirable to provide a document management system capable of utilizing the commands, icons and text associated with the underlying source applications. The desired system would be functionality rich system and would utilize a broad range of operators across many underlying source applications. The difficulties associated with the prior art discussed hereinabove are substantially eliminated by the present invention.

BRIEF DESCRIPTION OF THE DRAWINGS

The present invention is illustrated by way of example, and not by way of limitation, in the figures of the accompanying drawings, in which like reference numerals refer to similar elements and in which:

FIG. 3 is an example of an operations list including an Item document exemplar and an Item Schema exemplar that describes the structure of an Item document

DETAILED DESCRIPTION OF THE PREFERRED EMBODIMENT

Functional Overview

Figure 1:
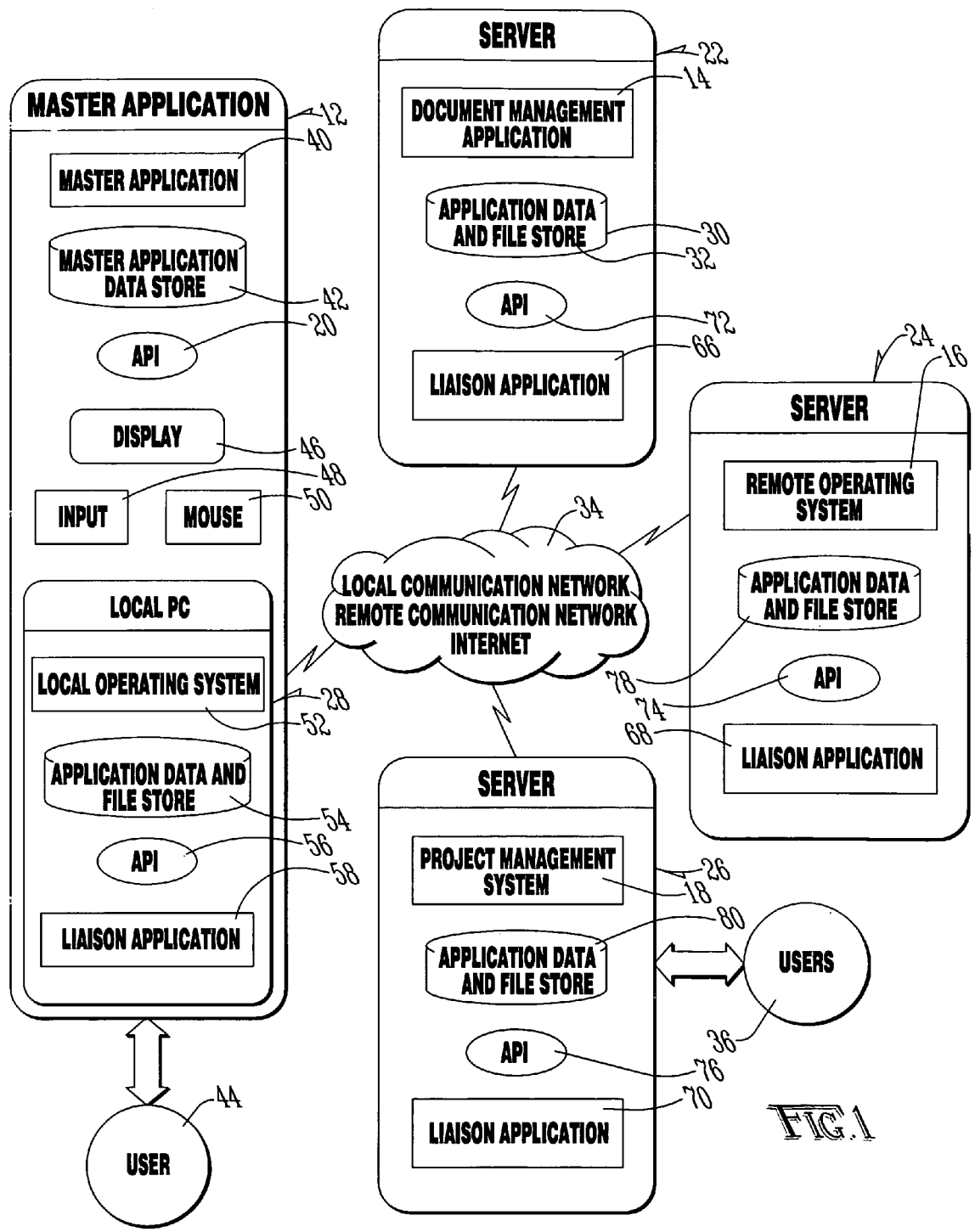
FIG. 1 is a block diagram that illustrates a computer accessing a server across a communication network according to an embodiment.

Document management is a critical component of the commercial building construction industry. Quick and accurate access to, and management of, different file types within a database, both during and after the construction phase reduces the time, cost and errors associated with project completion. Various types of files and folders of files, including blueprints, document management system files, photographs, documents and invoices all may need to be managed at one time or another. Typically, construction files are stored as many different file types, including, but not limited to, .pdf files, .doc files, .jpg files, .xls files, .mp3 files, .mpg files, zip files, .xml files and .dwg files, as well many other file types. One problem associated with these various files is that they can be stored and managed by different source applications. Some files may be stored in an operating system, while others might be stored within a project management application. Others may be available through an architectural application. Each application has its own way of representing and storing the files, and its own set of commands for the various files.

While different command, icon and text conventions for managing each different type of file may not be unduly burdensome for an information technology professional, memorizing all of the various permutations of command, icon and text for each separate source application, may prove unwieldy for persons not employed in the field of information technology arena. While there are document management systems which utilize their own command, icon and text conventions, this is merely one more convention the user must memorize. Additionally, such systems either do not allow certain source application file manipulation commands, or map those commands to master commands using a novel nomenclature the user may not readily be able to verify maps to a particular source application command.

The master application of the present invention requests an operations list from the underlying source applications, including commands, icons and text conventions. The master application maps "common" source commands to "common" master commands. The master application also maps text conventions associated with the common source commands to allow the user to confirm, prior to execution, that the proper source command is being employed.

The master application maintains a list of "uncommon" source commands which the master application dynamically generates and displays to the user upon request. The master application also correlates source application icons with the appropriate source application file type to allow the user to readily identify familiar file types. In the preferred embodiment, the master application presents the user with a single user interface, allowing the user to manage files stored in a wide array of formats associated with many underlying source applications.

Structured Overview

The problem addressed by the present invention is providing a single document management interface which allows a plurality of file types to be managed using native icons, a common set of master commands confirmed using source application nomenclature and dynamically generated non-standard commands.

The present invention primarily resides in a novel software program readily executed via known digital processing components and interacting with known source applications. In the following description, for the purpose of explanation, numerous specific details are set forth to provide a thorough understanding of the present invention. It will be apparent, however, that the present invention may be practiced without the specific details included herein. In certain instances, well known structures and devices are shown in block diagram form and descriptions of well known components and programming techniques are omitted, so as to avoid unnecessarily obscuring the method and system of the present invention with details readily apparent to those skilled in the art having the benefit of the disclosure before them.

Management of source application files of the present invention is not limited to any particular business. The invention defines management of source application files, using common master commands and uncommon source application specific commands within an environment of native icons and text.

As shown generally in FIG. 1, a block diagram provides a general overview of the system (10) and method employed by the present invention for utilizing a master software application (12) to access a plurality of source applications, (14), (16), (18), using a single application programming interface (API) (20). The first source application (14) is a document management application, the second source application (16) is an operating system, and the third source application (18) is a project management system application. All three applications are provided on separate servers (22), (24) and (26), but may, of course, be provided on a single server, or may be provided on the user's own computer (28).

Provided on the server (22) or elsewhere is memory (30) housing a data and file store (32) used by the source applications (14), (16) and (18). The server (22) is preferably coupled to the user's computer (28) via a communication network (34), such as the Internet, an intranet, or any other desired type of network. Additional servers (24) and (26) may be coupled to the communication network (34) to allow for additional source applications and additional users (36) to utilize the system (10) of the present invention.

The master application (12) includes source code (40) coupled to a data and file store database (42) and the API (20). A user (44) accesses the API (20) is via a display device (46), such as a monitor and input devices, such as a keyboard (48) and mouse (50). The user's computer (28), has its own operating system (52), data and file store database (54), API (56) and liaison application (58), which is described in greater detail below.

Figure 2A:
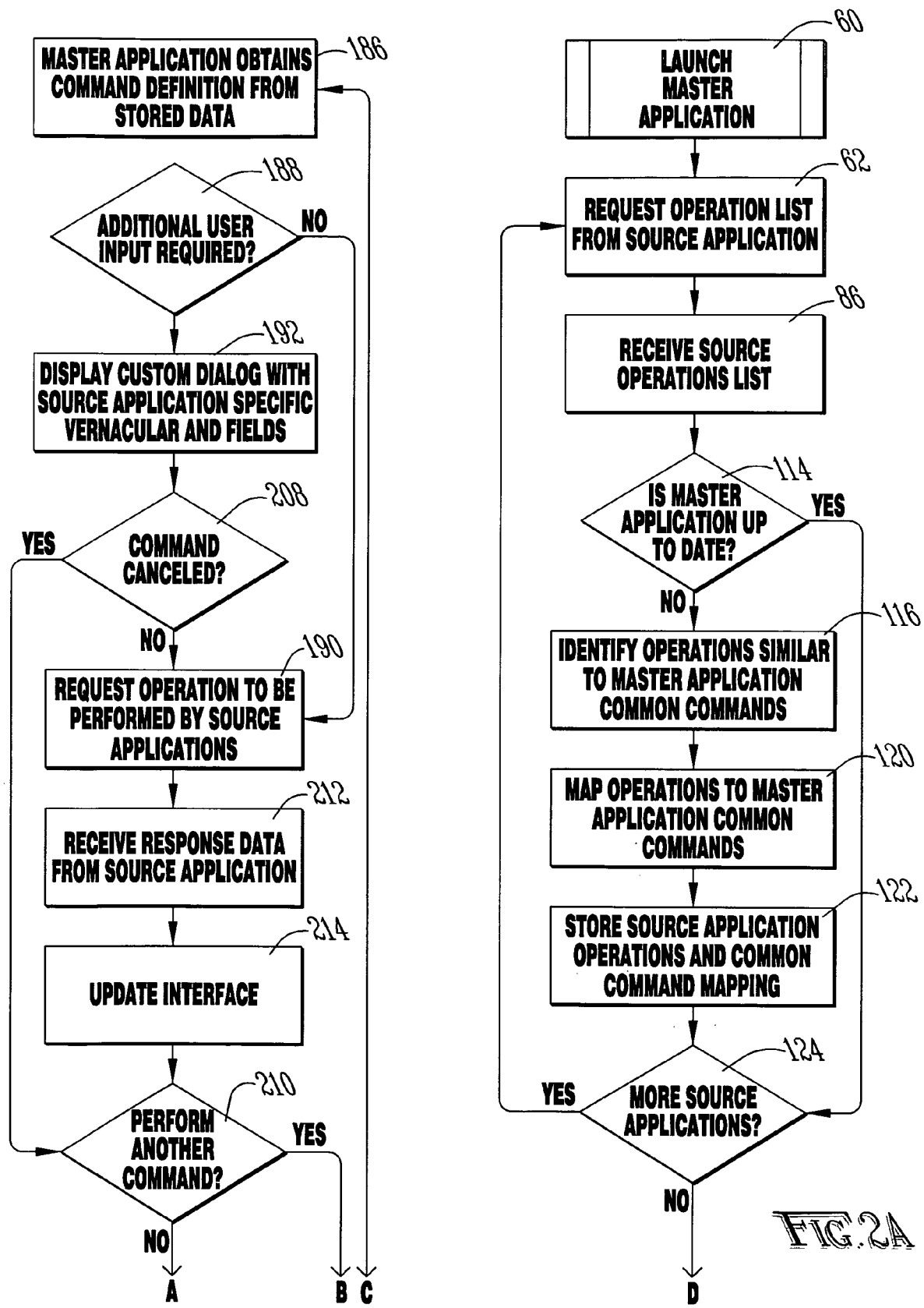
FIG. 2 is a flow diagram that illustrates an overview of a method for utilizing common operators to operate a plurality of applications.
Figure 2B:
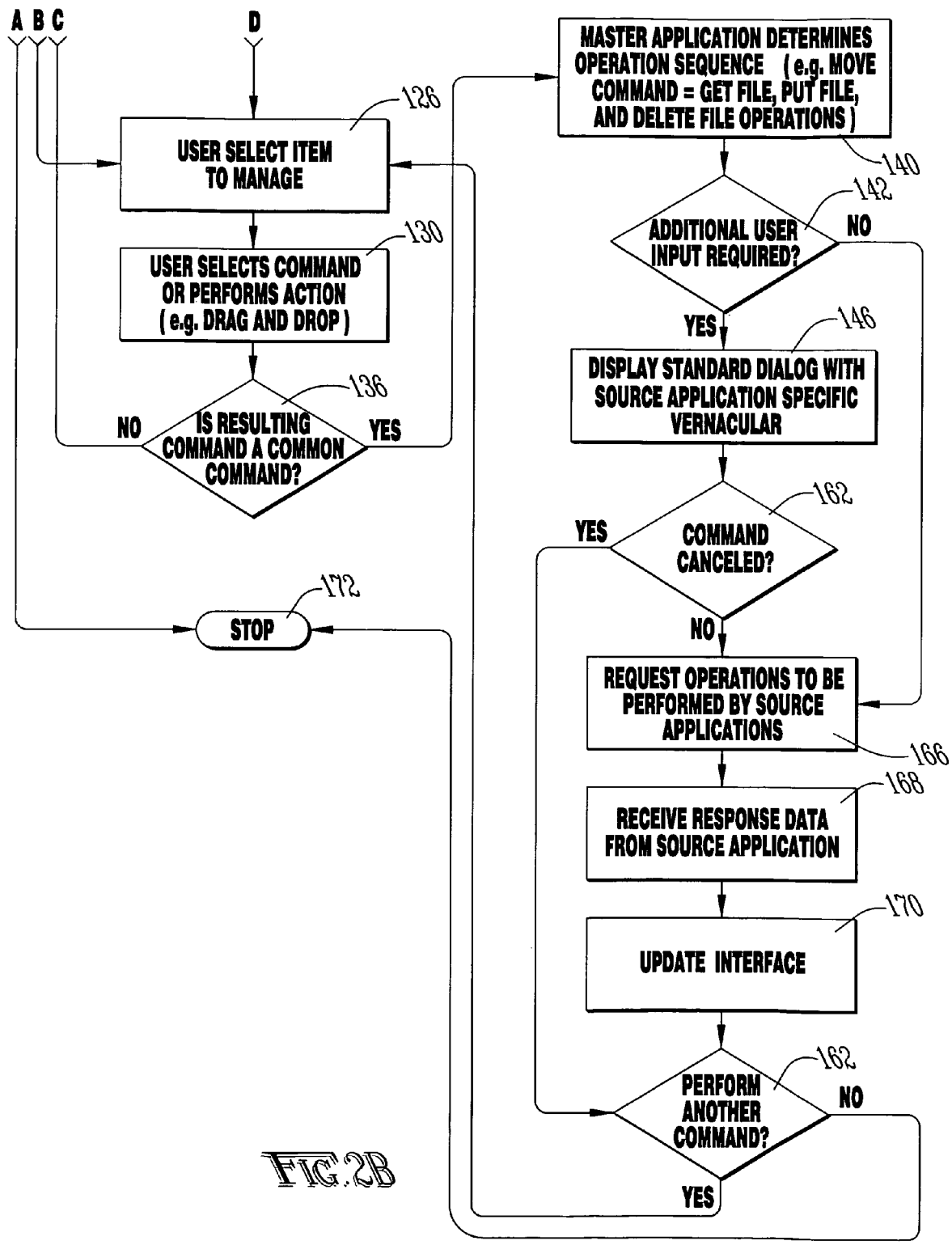

As shown in FIGS. 1-3, when it is desired to utilize the present invention, the user (44) launches (60) the master application (12). Upon launch (60), the master application (12) requests (62) an operations list (64) from the source applications (14), (16) and (18). To accomplish this task, liaison applications (66), (68) and (70) are coupled to known APIs (72), (74) and (76) and databases (30), (78) and (80) associated with each source application (22), (24) and (26). Each liaison application (66) understands the operations of the associated source application (14), as well as the communication mechanisms of the master application (12).

The master application (12) uses SOAP (Simple Object Access Protocol) to communicate with the liaison application (66). All communications are conducted using XML (Extensible Markup Language) Item documents. FIG. 3 illustrates the operations list (64). The operations list (64) includes an XML (Extensible Markup Language) Item document shown generally as (82) and a corresponding Item schema construct, shown generally as (84).

Item documents (82) and Item schema constructs (84) are not limited to just the operations list (64), but are used throughout the master application (12) and liaison applications (58), (66), (68) and (70) for all communications and configuration storage. An Item document (82) and Item schema construct (84) are used to make the request (62) for the operations list (64), and an Item document (82) and Item schema construct (84) are received (86) back with the operations list (64). In response to the request (62), the master application (12) also receives within the operations list (64), a list of the object types to which each operation can be applied, the necessary parameters for each operation, and the vernacular to be used within the master application's (12) graphical interface. The master application (12) receives stores and uses information from the operations list (64) to create corresponding menu items for both the common uncommon commands as described in more detail below.

Requesting (62) the source application operation lists (64) upon launch (60), enables the master application (12) to receive (86) a current list of operations for new versions of existing source applications (14), (16) and (18), as well as all recently added source applications. As described above, the operations lists (64) contain information relating to command, icon and text conventions associated with each of the source applications (14), (16) and (18).

As shown in FIGS. 1-4, when it is desired to utilize the system (10) of the present invention, the user (44) utilizes the input devices (48) and (50) to launch (60) the system (10) through the master application (12) on the user's computer (28). The master application (12) then displays on the user's monitor (46), a graphical user interface (90) having three panels, the navigation panel (92), the detail panel (94) and the properties panel (96). If desired, the user (44) may open an additional instance of the master application (12) to provide an additional interface (98) having its own navigation panel (100) details panel (102) and properties panel (104) to increase the number of files or documents that can be displayed and to aid in moving documents back and forth between locations.

The master application (12) requests information relating to the type of icons to display in association with each folder and file type in the operations list (64). The master application (12) requests the icon display information from each liaison application (66), (68) and (70) via SOAP and an Item document (82). The resulting "icon files" are stored with the master application (12), with new or modified icon files being requested, downloaded and stored as needed. All configuration references to icon files are stated relative to a base icon folder. The base icon folders are each provided within separate source application implementation subfolders of the master application's installed folder structure. Once stored within the appropriate source application implementation subfolder, the master application (12) can reference the icon file by operations, menus, toolbars, or any other element within the master application (12). If a given icon file is not available and cannot be downloaded from the liaison application, a set of default icons (106) associated with the master application (12) are used. Upon receipt (86) of the operations list (64), the master application (12) uses these icon files to display graphical icons (108), (110) and (112) on the graphical user interface (90) in association with their respective file types.

The master application (12) checks (114) to determine if it is up to date. The master application (12) may check (114) periodically, or based upon the number or type of requests made by the user (44). If the master application (12) is not up to date, the master application checks the operations list (64) to identify (116) operations associated with a particular source application (16) which similar to a predetermined list (118) of "common" commands associated with the master application (12). Common commands may include commands such as "Cut," "Copy," "Paste," "Delete," etc.

Preferably multiple source applications (14), (16) and (18) contain operations similar to the common commands. While the operations list (64) may not contain a operation associated with one or more source applications (14), (16) and (18) which matches the common commands exactly, in the preferred embodiment of the present invention, the source applications (14), (16) and (18) will have an operation which is at least similar to a common command. Whereas a common command might be "Copy," the operations list might list a similar source application operation designated as "Duplicate."

Once the relationship between the master application (12) common commands and source application (14) operations has been identified (116), the master application (12) maps (120) these relationships and stores (122) them in the master application data and file store database (42). Alternatively, the master application (12) may store (122) these mapped (120) relationships into the database (30) associated with the server (22) or elsewhere.

Once the master application (12) has stored the mapped relationships, the master application (12) determines (124) whether there are any additional source applications which have not been mapped. If there are additional source applications which have not been mapped, the process returns to step (62) and the master application (112) requests the operations list (64) from the next source application and continues the process until all of the source applications (14), (16) and (18) have been mapped.

Figure 4:
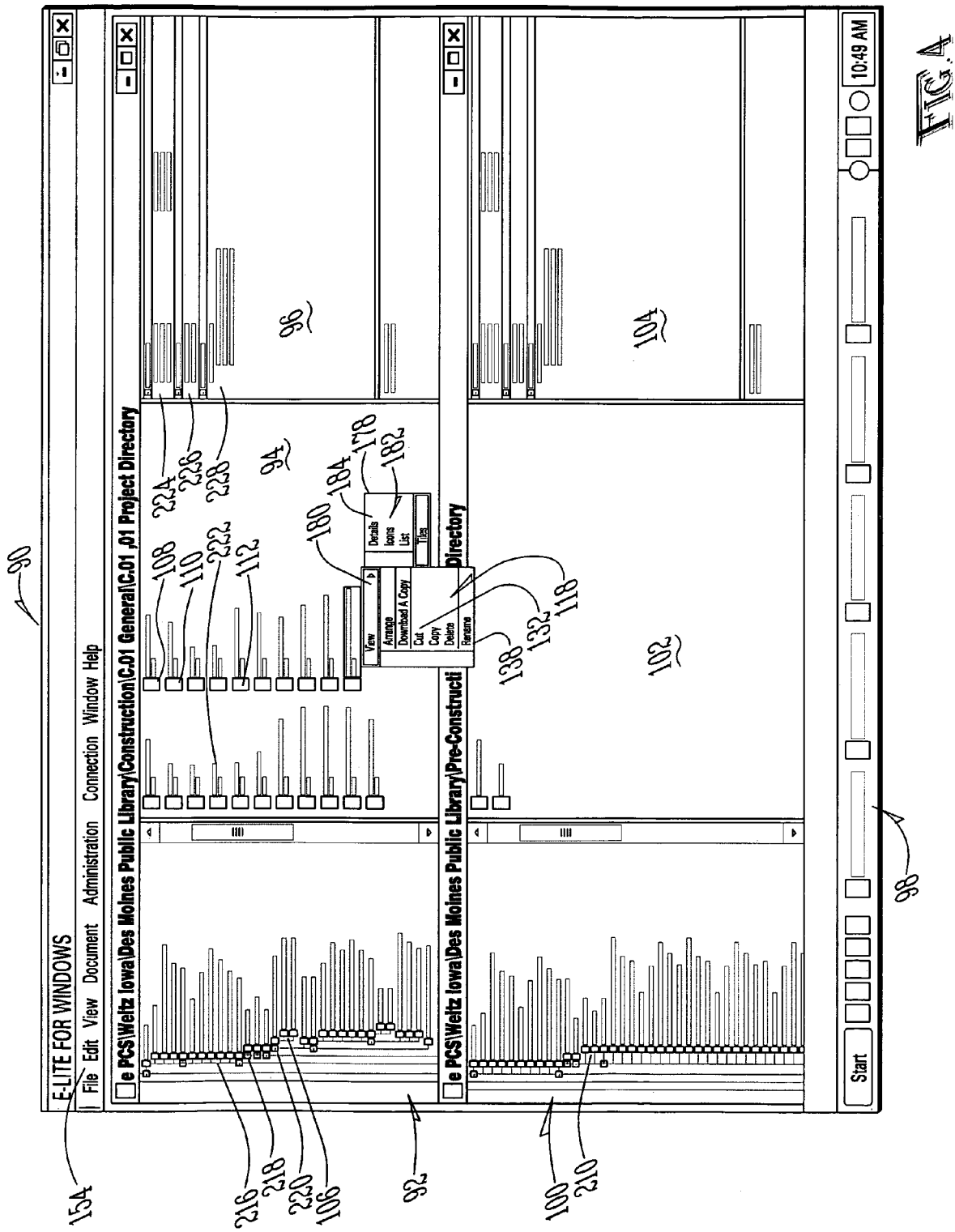
FIG. 4 is a template of the document management console used in association with the present invention.

Once all of the source applications have been mapped, the user (44) utilizes the mouse (50) to select (126) a particular item, such as a file (128), to manage. FIGS. 1, 2 and 4. The user (44) then selects (130) a common command (132) from available common commands (118) or perform an action, such as "drag and drop" on the file (128) or an uncommon command as explained more fully below. If the user (44) wishes to perform an action, such as "drag and drop," the user (44) simply proceeds with the action.

If (136) the user (44) wishes to execute a common command (132), the user (44) may "right click" on the file (128) with the mouse (50) causing the master application (12) to open a pop-up menu (138) listing the available common commands (118) associated with the file (128). The user (44) then selects the desired common command (132) by "left clicking" on the desired common command (132) with the mouse (50). Once the user (44) selects the desired common command (132), the master application (12) searches database (42) to determine (140) the operation mapped to the common command (132). Example operations may be GetFile, PutFile, DeleteFile or the like.

Figure 5:
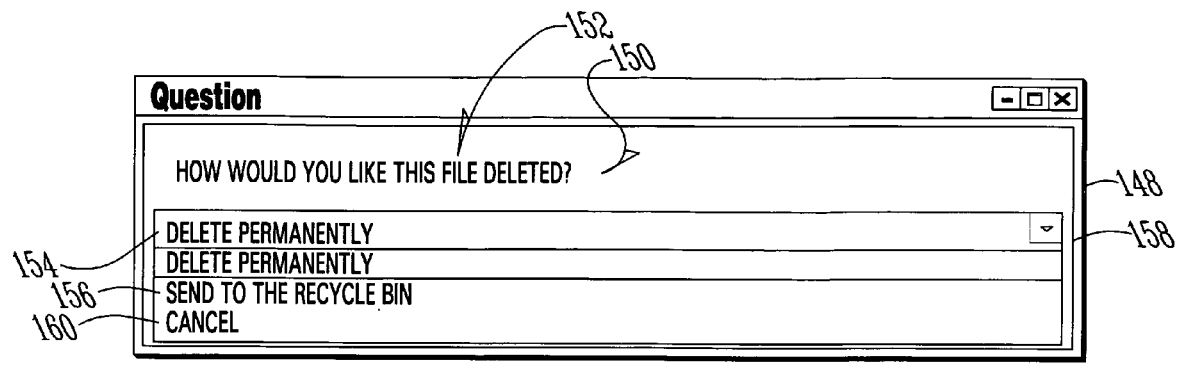
FIG. 5 is a pop-up master command menu of the present invention utilizing a first source application nomenclature.

Once the master application (12) has determined (140) the appropriate operations, the master application (12) determines (142) whether additional input is required from the user (44). If the master application (12) determines (142) that no additional input is required from the user (44), the process moves to step (144) described in more detail below. If the master application (12) determines (142) that additional input is required from the user (44), the master application (12) displays (146) a dialog box (148) as shown in FIG. 5. Operations requiring additional input from the user (44) have an additional attribute within the master application (12) operation's item schema (84). (FIGS. 1-3 and 5). This item schema (84) contains a query (150), source application specific text (152) associated with the source application operation, if any, and possible answers (154) and (156) to choose from for a given source application (14) and object or file (128). This information is put into a standard dialog box (148) which displays the query (150) and a drop-down list (158) of possible answers (154) and (156) and a "cancel" option (160).

If (162) the user (44) determines from the source application specific text (152), possible answers (154) and (156) or otherwise, that the source application operations mapped to the common command (132) are not the operations the user (44) desires to execute, the user (44) selects the cancel option (160) and the process moves to step (164), where the master application (12) queries the user (44) as to whether the user (44) wishes to execute another common command (132).

If (162), however, the user (44) determines that at least one of the source application operations mapped to the common command (132) is the command the user (44) desires to execute, the user (44) selects the desired command (154) and the master application (12) requests (166) the associated operation be performed on the file (128) by the source application (14). The master application (12) then receives (168) response data from the source application (14) reflecting the results of the source application operation being performed on the file (128). Using this response data, the master application (12) updates (170) the interface (90) to reflect the results of the operation. For instance, if the operation deleted the file (128) the updated interface (90) will no longer display the icon (108) associated with the file (128).

Once the interface (90) has been updated, the process moves to step (162) where the master application (12) determines whether the user (44) wishes to execute another command. If not, the process stops (172). If the user (44) does wish to execute another command, the process returns to step (126).

The user (44) again selects (126) the desired object or file (128) as outlined above. The user (44) then selects (130) the command associated with the operation the user (44) wishes to perform on the file (128). If uncommon commands are available, an "advanced" menu (178), is available. The master application (12) dynamically generates the advanced menu (178) from the Item document (82) of the operations list (62) for the current source application (14) when the master application (12) launches and after the master application (12) requests (62) the various operation lists (62) from each associated source application liaisons (66), (68) and (70). Once created, the advanced menu (178) is hidden until required by the user (44).

If (126), the operation the user (44) desires to perform is not a common operation, the user (44) selects the file (128) with the mouse (50) and selects the "advanced" option (180) from the pull down menu (138). The advanced option (180) opens the pop-up advanced menu (178) listing the available uncommon commands (182) associated with the file (128). From the advanced menu (178), the user (44) may select the desired uncommon command (184) from the list of uncommon commands (182) available for the current source application (14) and the currently selected objects or file (128) within the master application (12). An example of an uncommon command might be "Map Network Drive."

Figure 6:
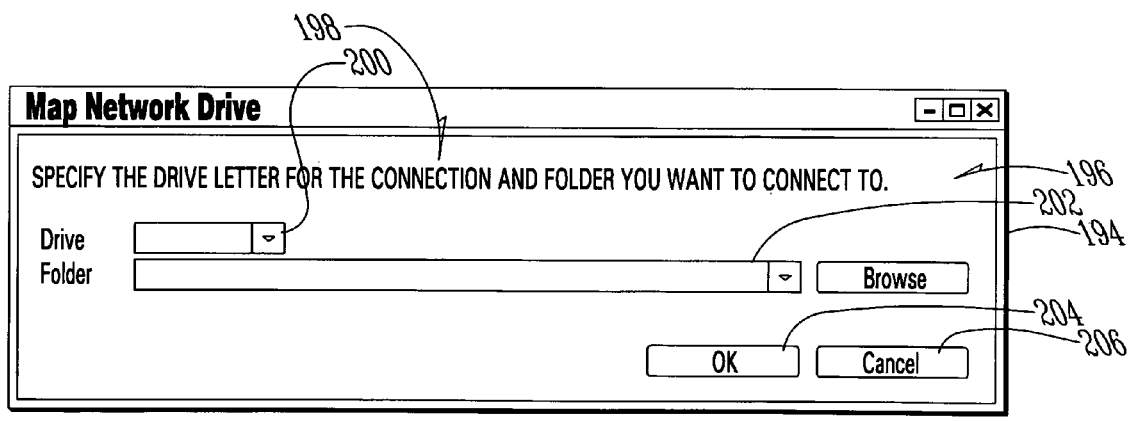
FIG. 6 is a dynamically generated pop-up first source application menu of the present invention.

Once the user (44) selects the desired uncommon command (184), the master application (12) obtains (186) command definitions previously mapped to the uncommon command (184) and stored in the database (42). The master application (12) then determines (188) whether additional input is required from the user (44). If the master application (12) determines (188) that no additional input is required from the user (44), the process moves to step (190) described in more detail below. If the master application (12) determines that additional input is required from the user (44), the master application (12) displays (192) a dialog box (194) as shown in FIG. 6. Operations requiring additional input from the user (44) have an additional attribute within the master application (12) operation's item schema (84). (FIGS. 1-3 and 6).

This item schema (84) contains a query (196), source application specific text (198) and other information, if any, associated with the source application operation. This information is put into a standard dialog box (194) which displays the query (196) and options, such as pull down menus (200) and (202) and confirmation (204) and cancel (206) options. The dialog box (194) is similar to the dialog box (148) described above. If even more direction is required from the user (44), however, the master application (12) describes the appropriate form of the dialog box (194) using XAML (eXtensible Application Markup Language). In the present invention, XAML simplifies creating a user interface for a programming model such as the .NET Framework programming model. The master application (12) may also create visible user interface elements in the declarative XAML markup. The master application (12) may then separate a user interface definition from the run-time logic using code-behind files, joined to the markup through partial class definitions. This also allows each dialog box (194) to contain its Own unique user interface.

If (208) the user (44) determines from the source application specific text (198), pull down menus (200) and (202) or otherwise, that the source application operations mapped to the uncommon command (184) are not the operations the user (44) desires to execute, the user (44) selects the cancel (206) option and the process moves to step (210), where the master application (12) queries the user (44) as to whether the user (44) wishes to execute another uncommon command (184). If (208) the user (44) determines that at least one of the source application operations mapped to the uncommon command (184) is the command the user (44) desires to execute, the user (44) selects the desired command (204) and the master application (12) requests (190) the associated operation be performed on the file (128) by the source application (14). The master application (12) then receives (212) response data from the source application (14) reflecting the results of the source application operation being performed on the file (128). Using this response data, the master application (12) updates (214) the interface (90) to reflect the results of the operation.

Once the interface (90) has been updated, the process moves to step (210) where the master application (12) determines whether the user (44) wishes to execute another command. If not, the process stops (164). If the user (44) does wish to execute another command, the process returns to step (126), with the process repeating until the user (44) does not wish to execute any additional commands.

As shown in FIG. 3, the navigation pane (92) provides a plurality of folders (216) from which a plurality of sub-folders (218) may depend. The folders (216) and sub-folders (218) may be located on the user's computer (28), the server (22) or another computer or server (24). From the plurality of sub-folders (218), additional sub-folders (220) and files (222) may also depend. Files may include portable document format files, computer aided drawing files, document management system files or any other file type known in the art.

As shown, for a particular selected file (128), the properties pane (96) displays the basic properties (224), such as file size, the dates and time related to the most recent modification (226), and miscellaneous information (228), such as a description. The master application (12) gathers this information (224), (226) and (228) as part of the operations list (64) gathered as part of the launch process. The master application (12) requests, downloads and stores Item documents (82) pertaining to object or file properties. This information is cached indefinitely and only updated if the initial request from the master application (12) indicates changes or additions to the object or file model. Since different source applications (14), (16) and (18) have different object types, the properties pane (96) is generated dynamically, based on which items are selected. Context-sensitive lists for any given properties are requested, downloaded, and created dynamically, on-the-fly, as needed.

The request by the master application (12) is made using an Item document (82) and all the corresponding lists are returned in an Item document (82). The requesting Item document (82) contains all the current property values of the selected items, so that lists can be generated and returned in real time based on the state of any and all selected items or files (48).

As changes are made to files (48) using common commands (118) and uncommon commands (182) in a manner such as that described above, such changes are stored on the database (42) associated with the server (22). If it desired to move a file (128) between folders (220) and (218), the user (44) simply utilizes the mouse (50) to drag and drop the file (128) between folders as desired.

Standard code makes the user interfaces (90) and (98) behave like typical drag-and-drop interfaces a user (44) would experience in any of a number of prior art applications. Unlike prior art application, however, once the user (44) drops an item such as a file (128), the master application (12) coordinates the various commands necessary to complete the user request with the source applications (14) and (16). For example, if a user (44) drags a file (128) from an operating system (16) source application to a document management system (DMS) (14) source application, indicating a request to move the file (128). The master application (12) interprets that action and splits the request into three separate commands:

1. Get File from the operating system
2. Put File to DMS
3. Delete File from operating system The master application (12) works in conjunction with the liaison applications, in this case the operating system liaison application (68) and the DMS liaison application (66) to accomplish these tasks. In this example, an Item document (82) containing the GetFile command request would be sent to the operating system liaison application (68) along with the file's ID (operating system path in this example). The next request from the master application (12) would be a PutFile to the DMS liaison application (66). The final request would be a DeleteFile request from the master application (12) back to the operating system liaison application (68). After the entire sequence is complete, the master application (12) updates the interfaces (90) and (98). For example, the user (44) would see the file (128) "appear" in the master application's representation of the DMS interface (90) and "disappear" from the master application's representation of the operating system interface (98). Files may be moved between folders containing similar files, or may be moved to folders containing completely different file types.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer implemented method for managing objects using predetermined master commands, the computer system comprising the steps of:

(a) providing a first object of a first object type;
    (b) providing a first source application;
    (c) associating said first source application with a first source operation;
    (d) associating said first source operation with a first source command;
    (e) providing a second file of a second object type;
    (f) providing a second source application;
    (g) associating said second source application with a second source operation;
    (h) associating said second source operation with a second source command;
    (i) associating a master application with said first application and said second application;
    (j) associating a first master command with said first source operation;
    (k) associating a second master command with said second source operation;
    (l) requesting a first source operations list from said first source application;
    (m) providing said first source operations list from said first source application to said master application;
    (n) wherein said first source operations list comprises first information relating to said first source operation;
    (o) requesting a second source operations list from said source application;
    (p) providing said second source operations list from said second source application to said master application;
    (q) wherein said second source operations list comprises second information relating to said second source operation;
    (r) associating a first predetermined command with said master application;
    (s) associating a second predetermined command with said master application;
    (t) associating said first predetermined command with said first source operation using said first information from said first source operations list;
    (u) associating said second predetermined command with said second source operation using said second information from said second source operations list;
    (v) associating a input device with said master application;
    (w) using said input device to select said first predetermined command and said first object;
    (x) executing said first source operation on said first object in said first source application in response to said using said input device to select said first predetermined command and said input device;
    (y) using said input device to select said second predetermined command and said second object; and
    (z) executing said second source application on said second object in said second source application in response to said selecting of said second predetermined command with said input device.

2. The computer implemented method of claim 1, wherein said first predetermined command is different than said first source command, and wherein said second predetermined command is different than said second source command.

3. The computer implemented method of claim 1, wherein said first source application is an operating system, and said second source application is a document management system application.

4. The computer implemented method of claim 1, wherein said first source operations list comprises an association between said first source operation and said first source command.

5. The computer implemented method of claim 1, further comprising the steps of:

(a) providing a display;

(b) displaying said first source command on said display in response to said using said input device to select said first predetermined command and said first object; and (c) displaying said second source command on said display in response to said using said input device to select said second predetermined command and said second object.

6. The computer implemented method of claim 5, wherein said first source command is different than said first predetermined command and wherein said second source command is different than said second predetermined command.

7. The computer implemented method of claim 1, further comprising the steps of:

(a) providing a display;

(b) providing a plurality of uncommon commands mapped to a plurality of uncommon operations associated with said first source application;

(c) including said plurality of uncommon commands within said first source operations list;

(d) dynamically generating a list of said plurality of uncommon commands; and (e) displaying said list of said plurality of uncommon commands on said display.

8. The computer implemented method of claim 7, further comprising the steps of:

(a) selecting a first uncommon command from said list of uncommon commands with said input device; and (b) executing in said first source application a first uncommon operation, mapped by said first source application with said first uncommon command, in response to said selecting of said first uncommon command with said input device.

9. The computer implemented method of claim 8, further comprising the steps of:

(a) wherein said first source operations list comprises information relating to a first graphic associated with said first object type;

(b) wherein said second source operations list comprises information relating to a second graphic associated with said second object type;

(c) displaying said first object as said first graphic on said display; and (d) displaying said second object as said second graphic on said display.

10. The computer implemented method of claim 9, wherein said first graphic is a first icon and wherein said second graphic is a second icon.

11. The computer implemented method of claim 1, further comprising the steps of:

(a) providing a display;

(b) wherein said first source operations list comprises information relating to a first graphic associated with said first object type;

(c) wherein said second source operations list comprises information relating to a second graphic associated with said second object type;

(d) displaying said first object as said first graphic; and (e) displaying said second object as said second graphic.

12. A computer implemented method for managing objects using predetermined master commands, the computer system comprising the steps of:

(a) providing a first source application;

(b) associating a first object type with said first source application;

(c) associating a first object with said first object type;

(d) associating a first graphic with said first object type within said first source application;

(e) associating a first source operation with said first source application;

(f) associating a first source command with said first source operation;

(g) providing a second source application;

(h) associating a second object type with said second source application;

(i) associating a second object with said second object type;

(j) associating a second graphic with said second object type within said second source application;

(k) associating a second source operation with said second source application;

(l) associating a second source command with said second source operation;

(m) associating a master application with said first source application and with said second source application;

(n) associating a first predetermined command with said master application;

(o) associating a second predetermined command with said master application;

(p) associating a input device with said master application;

(q) associating a display with said master application;

(r) requesting a first source operations list from said first source application;

(s) wherein said first source operations list comprises first information relating to said first source operation and said first graphic;

(t) providing said first source operations list from said first source application to said master application;

(u) displaying said first graphic in association with said first object on said display;

(v) requesting a second source operations list from said second source application;

(w) wherein said second source operations list comprises second information relating to said second source operation and said second graphic;

(x) providing said second source operations list from said second source application to said master application;

(y) displaying said second graphic in association with said second object on said display;

(z) selecting said first object with said user feedback device;

(aa) displaying said first source command on said display in response to said selecting said first object and said first predetermined command with said user feedback device;

(bb) executing said first source operation on said first object in response to said selecting said first object and said first predetermined command with said user feedback device;

(cc) selecting said second object with said user feedback device and said second predetermined command;

(dd) displaying said second source command on said display in response to said selecting said second object and said second predetermined command with said user feedback device; and (ee) executing said second source command on said second object in response to said selecting said second object and said second predetermined command with said user feedback device.

13. The computer implemented method claim 12, wherein said first predetermined command is different than said first source command.

14. The computer implemented method of claim 12, wherein said first source operations list comprises an association between said first source operation and said first source command.

15. The computer implemented method of claim 12, further comprising the steps of:
(a) providing a plurality of uncommon commands mapped to a plurality of uncommon operations associated with said first source application;
(b) including said plurality of uncommon commands within said first source operations list;
(c) dynamically generating a list of said plurality of uncommon commands; and
(d) displaying said list of said plurality of uncommon commands on said display.

16. The computer implemented method of claim 15, further comprising the steps of:
(a) selecting a first uncommon command from said list of uncommon commands with said input device; and
(b) executing in said first source application, in response to said selecting of said first source command with said input device, a first uncommon operation associated by said first source operations list with said first uncommon command.

17. The computer implemented method of claim 12, wherein said first graphic is an icon.

18. A computer implemented method for managing objects using predetermined master commands, the computer system comprising the steps of:
(a) providing a source application;
(b) associating a object type with said source application;
(c) associating a object with said object type;
(d) mapping a common source command to a common source operation associated with said source application;
(e) associating a graphic with said object type;
(f) mapping a plurality of uncommon source commands to operations associated with said source application;
(g) associating a master application with said source application;
(h) associating a common master command with said master application;
(i) wherein said common master command is different than said common source command;
(j) requesting an operations list from said source application, said operations list comprising:
  (i) said common source command;
  (ii) said graphic; and
  (iii) said plurality of uncommon source commands;
(k) providing said operations list from said source application to said master application;
(l) associating a display with said master application;
(m) associating a input device with said master application;
(n) representing said object on said display with said graphic;
(o) selecting said object and said common master command;
(p) executing said common source operation on said object in response to said selecting said object and said common master command with said input device;
(q) dynamically generating a display list of said plurality of uncommon source commands;
(r) displaying said display list of said plurality of uncommon source commands on said display within said master application;
(s) selecting an uncommon source command from said list of said plurality of uncommon commands using said input device; and
(t) executing an operation associated with said source application and associated with said uncommon source command selected from said list of said plurality of uncommon commands.

19. The computer implemented method of claim 18, further comprising the step of displaying a query including said common source command.

20. The computer implemented method of claim 19, wherein said source application is an operating system.

* * * * *